United States Patent
Oesterling et al.

(10) Patent No.: US 7,957,744 B2
(45) Date of Patent: Jun. 7, 2011

(54) METHOD AND SYSTEM FOR DELIVERING TELEMATICS SERVICES VIA A HANDHELD COMMUNICATION DEVICE

(75) Inventors: Christopher L. Oesterling, Troy, MI (US); Julianne Petschke, Shelby Township, MI (US)

(73) Assignee: General Motors LLC, Detroit, MI (US)

( * ) Notice: Subject to any disclaimer, the term of this patent is extended or adjusted under 35 U.S.C. 154(b) by 1696 days.

(21) Appl. No.: 11/129,464

(22) Filed: May 13, 2005

(65) Prior Publication Data

US 2006/0258379 A1 Nov. 16, 2006

(51) Int. Cl.
*H04W 40/00* (2009.01)

(52) U.S. Cl. ............ 455/445; 455/466; 455/412.1; 701/32

(58) Field of Classification Search ............ 455/445, 455/466, 412.1, 404.2, 428, 414.1, 426.1, 455/556.1, 415; 340/426.28, 457, 539.17, 340/425.5; 701/33.32
See application file for complete search history.

(56) References Cited

U.S. PATENT DOCUMENTS

| | | | |
|---|---|---|---|
| 5,027,104 A | | 6/1991 | Reid |
| 6,148,212 A | | 11/2000 | Park et al. |
| 6,310,543 B1 | * | 10/2001 | Yoshioka et al. ............ 340/436 |
| 6,330,499 B1 | | 12/2001 | Chou et al. |
| 6,434,223 B2 | | 8/2002 | Katz |
| 6,604,033 B1 | | 8/2003 | Banet et al. |
| 6,611,740 B2 | | 8/2003 | Lowrey et al. |
| 6,721,572 B1 | | 4/2004 | Smith et al. |
| 6,748,211 B1 | * | 6/2004 | Isaac et al. ............ 455/414.1 |
| 6,983,171 B2 | * | 1/2006 | Van Bosch et al. ............ 455/557 |
| 7,046,168 B2 | * | 5/2006 | Tsuboi ............ 340/903 |
| 7,120,455 B1 | * | 10/2006 | Chen et al. ............ 455/466 |
| 2002/0049535 A1 | | 4/2002 | Rigo et al. |
| 2002/0115423 A1 | * | 8/2002 | Hatae et al. ............ 455/404 |
| 2002/0130769 A1 | | 9/2002 | Yamagishi |
| 2003/0164778 A1 | | 9/2003 | Muramatsu |
| 2003/0193390 A1 | | 10/2003 | Muramatsu |
| 2003/0214392 A1 | | 11/2003 | Flick |
| 2003/0216889 A1 | | 11/2003 | Marko et al. |
| 2004/0185800 A1 | * | 9/2004 | Van Bosch et al. ............ 455/99 |
| 2004/0203634 A1 | | 10/2004 | Wang et al. |
| 2004/0203672 A1 | | 10/2004 | Crocker et al. |
| 2004/0242198 A1 | | 12/2004 | Oyagi et al. |

(Continued)

OTHER PUBLICATIONS

U.S. Appl. No. 10/164,492, filed Jun. 6, 2002, Dwayne A. Crocker, et al.

*Primary Examiner* — Melur Ramakrishnaiah
(74) *Attorney, Agent, or Firm* — Anthony Luke Simon; Reising Ethington P.C.

(57) ABSTRACT

A method for providing vehicle services to a user of a motor vehicle includes receiving a text message from the user via a handheld communication device in wireless communication with a call center and requesting vehicle information from a telematics unit in a vehicle associated with the user via a wireless connection. At least one vehicle service is provided based on the text message and the requested vehicle information. Another embodiment provides a method for transmitting a text message to a hearing impaired user of a motor vehicle includes receiving a trigger-based request from a telematics unit at a call center, via a wireless communication and determining a handheld communication device associated with the telematics unit. A text message is transmitted to a hand-held device associated with the user.

19 Claims, 7 Drawing Sheets

U.S. PATENT DOCUMENTS

| | | |
|---|---|---|
| 2005/0085221 A1 | 4/2005 | Sumcad |
| 2005/0186941 A1* | 8/2005 | Gault et al. .................. 455/411 |
| 2005/0256615 A1* | 11/2005 | Wang et al. ....................... 701/1 |
| 2005/0261035 A1* | 11/2005 | Groskreutz et al. ....... 455/569.2 |
| 2006/0038674 A1* | 2/2006 | Sumcad et al. .......... 340/539.18 |
| 2006/0135215 A1* | 6/2006 | Chengalvarayan et al. ......................... 455/569.2 |
| 2006/0190162 A1* | 8/2006 | Ampunan et al. ............ 701/117 |

\* cited by examiner

FIG. 7
700

| | |
|---|---|
| V0001 | HCU0052 |
| V0004 | HCU9845 |
| V5678 | HCUAE$R |

METHOD AND SYSTEM FOR DELIVERING TELEMATICS SERVICES VIA A HANDHELD COMMUNICATION DEVICE

FIELD OF THE INVENTION

The present invention generally relates to enabling telematics services via a handheld communication device.

BACKGROUND OF THE INVENTION

The provision of telematics services to hearing impaired drivers is fraught with difficulties. Hearing impaired drivers are also referred to as deaf, hard of hearing, or speech impaired drivers. Prior attempts to solve this issue have operated using a TTY-machine based in-vehicle.

However, such solutions require additional hardware, add cost to the vehicle, and increase difficulty of use.

The present invention overcomes these disadvantages and advances the state of the art.

SUMMARY OF THE INVENTION

One aspect of the present invention provides a method for providing vehicle services to a user of a motor vehicle including receiving a text message from the user via a handheld communication device in wireless communication with a call center and requesting vehicle information from a telematics unit in a vehicle associated with the user via a wireless connection. At least one vehicle service is provided based on the text message and the requested vehicle information.

Another embodiment provides a method for transmitting a text message to a deaf user of a motor vehicle including receiving a trigger-based request from a telematics unit at a call center, via a wireless communication and determining a handheld communication device associated with the telematics unit. A text message is transmitted to a hand-held device associated with the user.

Another aspect of the invention provides a computer usable medium including computer readable code for providing vehicle services to a user of a motor vehicle including computer readable code for receiving a text message from the user via a handheld communication device in wireless communication with a call center and computer readable code for requesting vehicle information from a telematics unit in a vehicle associated with the user via a wireless connection. The medium further includes computer readable code for providing at least one vehicle service based on the text message and the requested vehicle information.

Another embodiment provides a computer usable medium including computer readable code for transmitting a text message to a speech impaired user of a motor vehicle including computer readable code for receiving a trigger-based request from a telematics unit at a call center, via a wireless communication and computer readable code for determining a handheld communication device associated with the telematics unit. The medium further includes computer readable code for transmitting a text message to a hand-held device associated with the user.

Another aspect of the present invention provides a system for providing vehicle services to a user of a motor vehicle including means for receiving a text message from the user via a handheld communication device in wireless communication with a call center and means for requesting vehicle information from a telematics unit in a vehicle associated with the user via a wireless connection. The system further includes means for providing at least one vehicle service based on the text message and the requested vehicle information.

The aforementioned and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

BRIEF DESCRIPTION OF THE DRAWINGS

FIG. 7 illustrates one embodiment of a look-up table in accordance with another aspect of the invention.

DETAILED DESCRIPTION OF THE PREFERRED EMBODIMENTS

Figure 1:
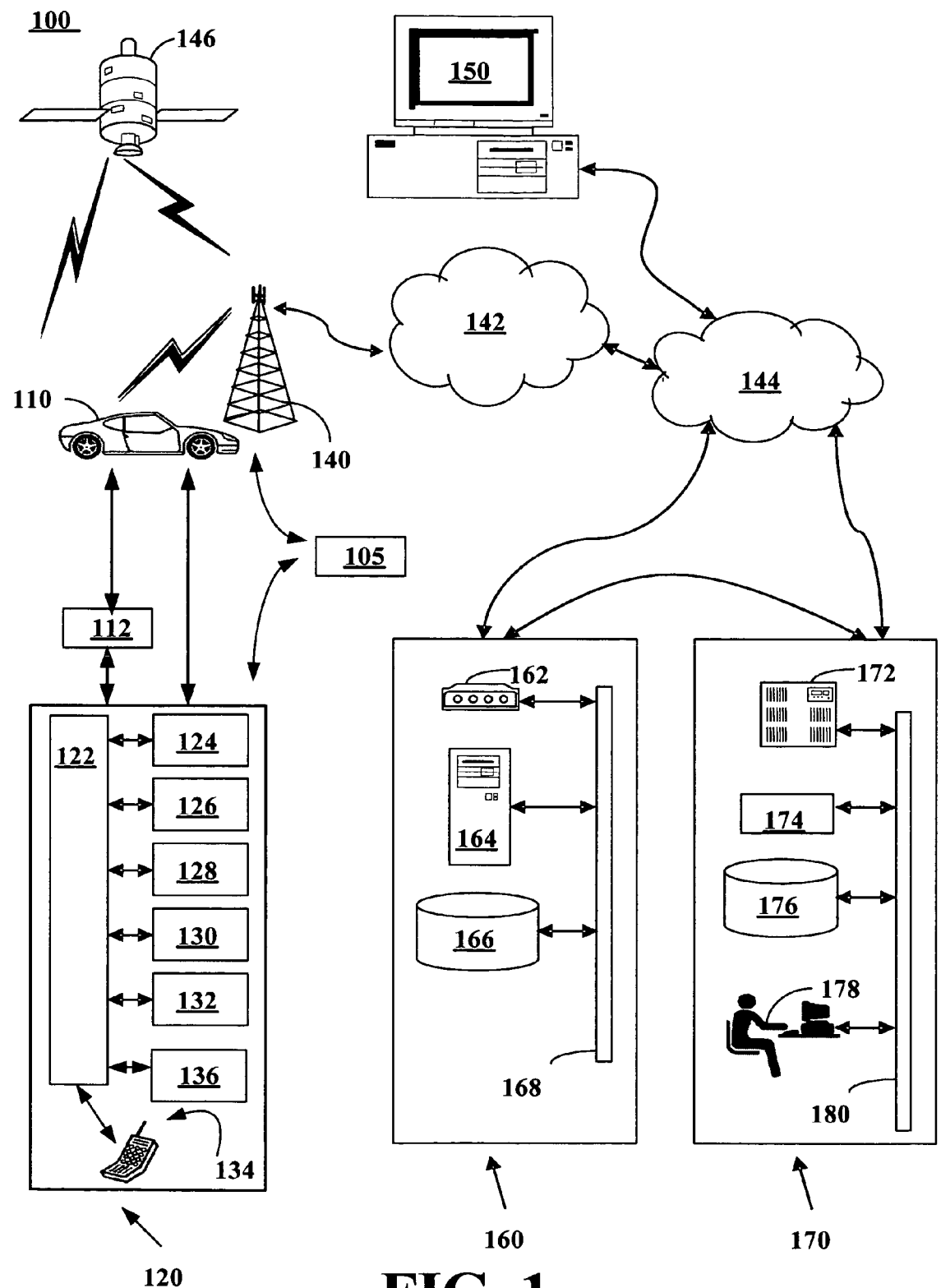
FIG. 1 illustrates an operating environment for delivering telematics services.

FIG. 1 illustrates an operating environment for a mobile vehicle communication system ("MVCS") 100 for delivering telematics services. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112, sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. In one embodiment, telematics unit 120 includes a battery power monitor 136 operably connected to a vehicle battery and configured to estimate a battery power level. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Handheld communication device 105 is any communication device configured to be portable and configured to transmit and receive text messages. In one embodiment, handheld communication device 105 is implemented as a BlackBerry® device, while in other embodiments handheld communication device 105 is implemented as a device configured for substantially instantaneous transmission of non-vocal information. In another embodiment, handheld communication device 105 is implemented as a device configured to operate using an instant message format, such as Yahoo! Messenger, AOL Instant Messenger, MSN Messenger or other such protocols. In one embodiment, handheld communication device 105 is configured to transmit text messages to telematics unit 120 using a short-range wireless communication protocol, such as a FCC Part 15 protocol. In another embodiment, handheld communication device 105 is configured to transmit text messages to wireless carrier system 140, or another wireless network using a wireless communication protocol. In another embodiment, handheld communication device 105 is configured to communicate with satellite broadcast system 146. In one embodiment, handheld communication device 105 is configured to communicate with a wireless network, such as wireless carrier system 140 and the handheld communication device is configured to communicate with, inter alia, a satellite broadcast system 146. Handheld communication device 105, in other embodiments, includes other functionality such as cellular telephone, personal digital assistant, lap top computer, etc.

In one embodiment, a vehicle mount and charger are attached to a surface within MVCU 110 for supporting handheld communication device 105. In one embodiment, such a mount and charger allow for removable support of the handheld communication device 105, enabling the handheld communication device 105 to be removed from the vehicle.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164 hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180. In one embodiment, communication services manager 174 includes at least one digital and/or analog modem.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
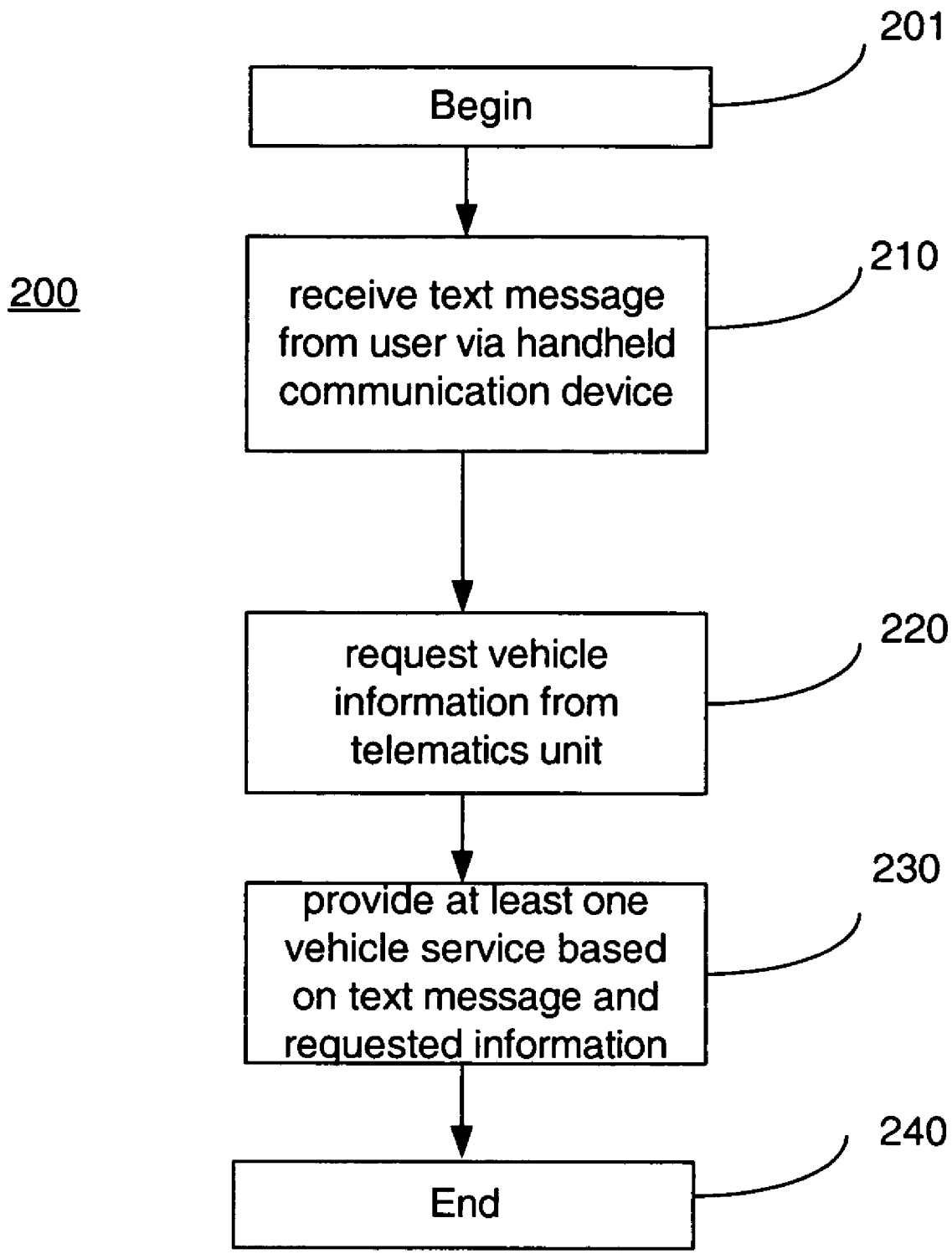
FIG. 2 illustrates one embodiment of a method for delivering telematics services in accordance with one aspect of the invention.

FIG. 2 illustrates one embodiment of a method 200 for delivering telematics services in accordance with one aspect of the invention. Method 200 begins at step 201.

The call center receives a text message from a user of MVCU 110 via a handheld communication device at step 210. A text message is any visual message sent in a format intended to be understood by a human recipient. For example, a text message may be comprised of ASCII (American Standard Coded Information Interchange) characters rendered on a handheld communication device (FIG. 1, 105) as human readable text. As another example, a text message may be comprised of Unicode characters rendered on a handheld communication device (FIG. 1, 105) as human readable text. In yet another example, a text message may be comprised of a binary bit string, so encoded as to be rendered on a handheld communication device (FIG. 1, 105) as human readable text. A text message, in one embodiment, is configured as a SMS message, while in other embodiments, a text message is configured as an instant message format. In some embodiments, SMS experiences noticeable latency. Preferably, a text message is sent using a protocol without latency perceptible to a human, or a latency approximately equal to 2 seconds or less.

In one embodiment, the text message includes the identity of a vehicle associated with the handheld communication device. For example, handheld communication device 105 includes a vehicle identification number, such as the VIN, or the serial number of the telematics unit in the message header. In another embodiment, the text message includes an identification of the handheld communication device 105 in the header, and the call center looks up the identification in a look-up table to determine a vehicle associated with the user of the handheld communication device 105.

In response to receiving the text message, the call center requests vehicle information from the telematics unit in the vehicle associated with the user via a wireless connection at step 220. For example, in response to a text message seeking driving directions, the call center may contact the telematics unit to determine a current vehicle location as a starting point of the route. The telematics unit receives the vehicle information request, determines and obtains the requested information, and transmits a response responsive to the request to the call center using a wireless connection.

Based on the requested vehicle information and the text message, the call center provides at least one vehicle service to the user at step 230. For example, if the text message relates to driving directions, the call center will then provide driving directions to the user. The vehicle service is provided in any appropriate fashion, with any communications for the user being transmitted via a wireless network to the handheld communications device 105. Method 200 ends at step 240.

Figure 3:
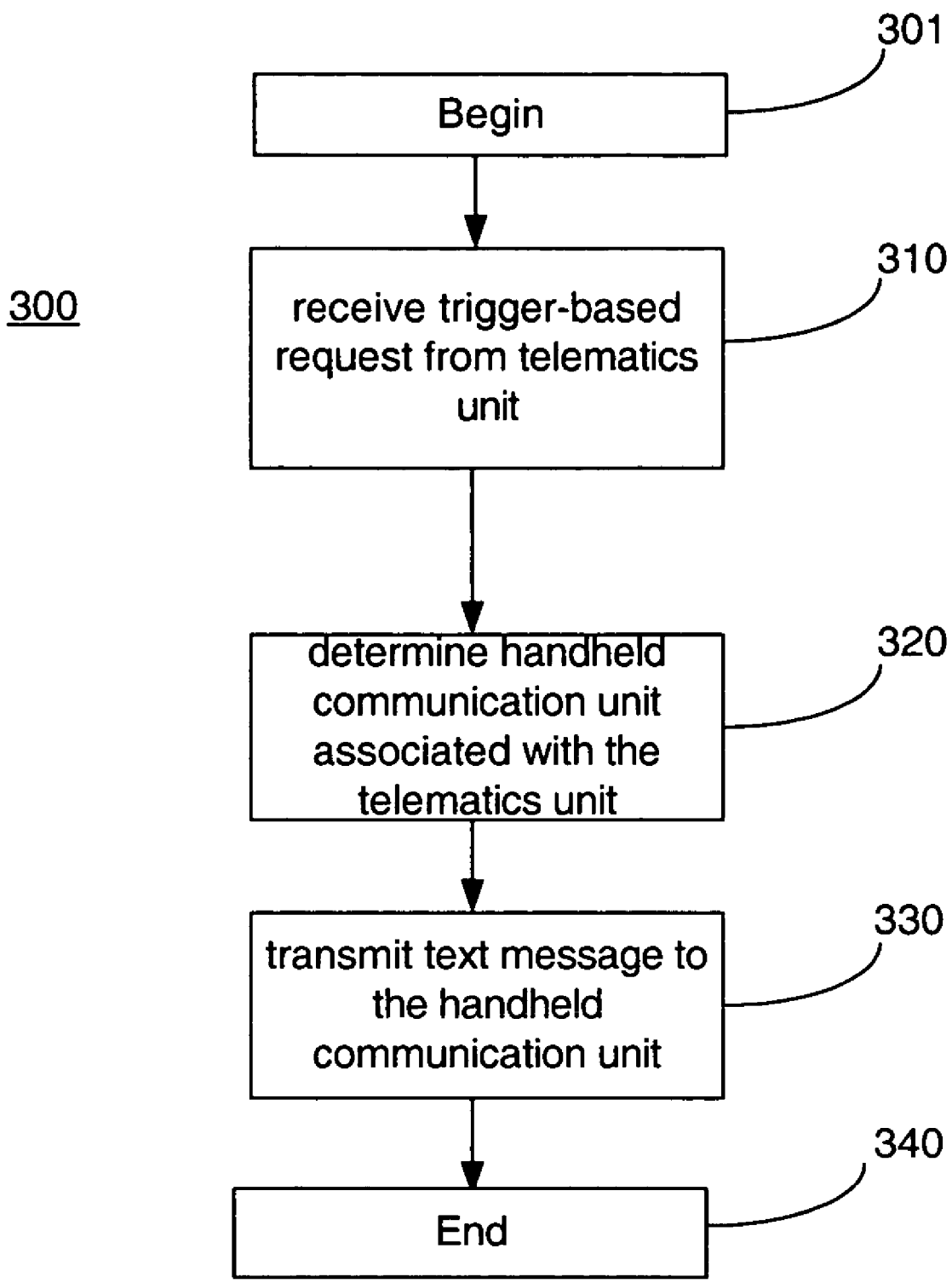
FIG. 3 illustrates another embodiment of a method for delivering telematics services in accordance with one aspect of the invention.

FIG. 3 illustrates one embodiment of a method 300 for transmitting a text message to a speech impaired user of a motor vehicle, in accordance with one aspect of the invention. Method 300 begins at step 301.

A trigger-based request from a telematics unit is received at a call center at step 310. A trigger-based request is any communication request received based on an event other than a user directly initiating communication with the call center. For example, many telematics units are configured to contact the call center upon activation of an airbag, such that airbag activation serves as a trigger. The trigger-based request is transmitted to the call center via a wireless communication.

In response to receiving the trigger-based request, the call center determines a handheld communication unit associated with the telematics unit at step 320. As in step 220, the association between the handheld communication unit and telematics unit may be transmitted in the header of the trigger-based request, or the association may be determined via a look-up table at the call center.

A text message is transmitted to the handheld communication device associated with the user at step 330. For example, in response to a trigger-based request indicating airbag deployment, the text message may request an update from the user regarding their physical well-being. Other messages are envisioned within the scope of this disclosure.

In one embodiment, communications between the handheld communications unit and the call center are routed through the telematics unit, with the telematics unit communicating with the handheld communication unit via a short-range wireless network protocol, and the telematics unit communicating with the call center via a wireless network. In one embodiment, transmitting the text message during step 330 comprises transmitting a text message to the telematics unit via a wireless network and transmitting the text message from the telematics unit to the handheld communication device via a short range wireless network. Method 300 ends at 340.

Figure 4:
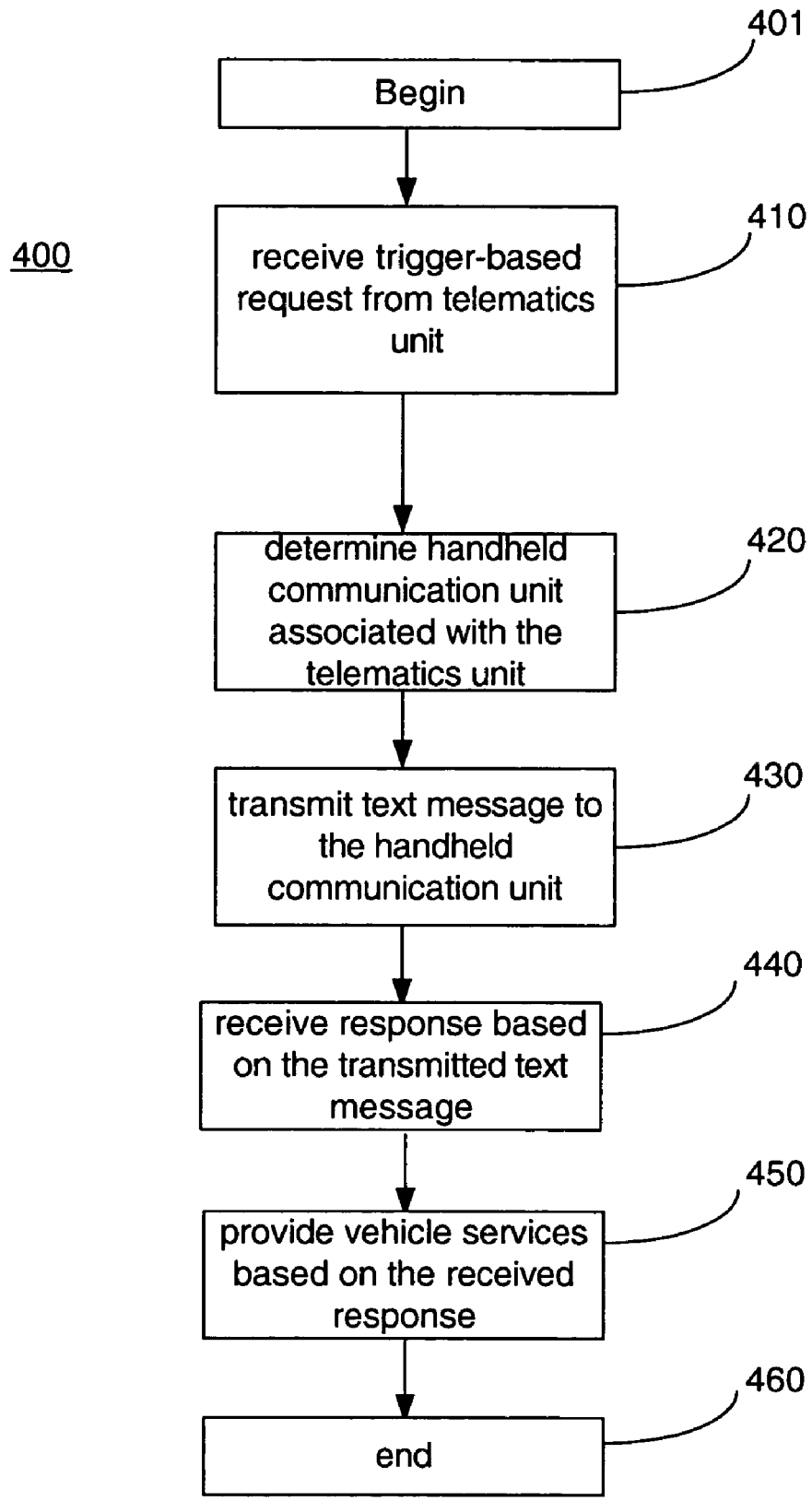
FIG. 4 illustrates another embodiment of a method for delivering telematics services in accordance with one aspect of the invention.

FIG. 4 illustrates one embodiment of a method 400 for transmitting a text message to a speech impaired user of a motor vehicle, in accordance with one aspect of the invention. Method 400 begins at step 401.

A trigger-based request from a telematics unit is received at a call center at step 410. In one embodiment, step 410 is implemented as step 310.

In response to receiving the trigger-based request, the call center determines a handheld communication unit associated with the telematics unit at step 420. In one embodiment, step 420 is implemented as step 320.

A text message is transmitted to the handheld communication device associated with the user at step 330. In one embodiment, step 430 is implemented as step 330.

After transmitting the text message, method 400 receives a user response based on the transmitted text message at step 440.

Based on the receipt of a response, or the non-receipt of a response, vehicle services are provided in response to the transmitted text message and trigger-based request at step 450. In the airbag deployment example, if the call center receives an "I'm okay" response, the call center may provide the service of calling a tow truck. Alternatively, and remaining with the airbag deployment example, in the event that either the call center does not receive a response or the response requests medical assistance, medical assistance may be requested by the call center to the location of the vehicle. The provision of vehicle services comprises, in one embodiment, polling the telematics unit to determine additional information relating to the appropriate services, such as a GPS location, in one embodiment. Method 400 ends at 460.

In one embodiment, the call center determines whether the vehicle associated with the handheld communication device is moving while the call center is communicating with the user of the handheld communication device. Such a determination, in one embodiment, is made by polling the telematics unit to determine, for example, a transmission status (i.e., in park, neutral, $1^{st}$ gear, etc), a vehicle speed determined by either a speedometer, odometer pulses, wheel speed indicator, GPS location differences between communication transmissions, or other methods of determining whether a vehicle is moving, as known in the art. In one embodiment, if the vehicle is moving or capable of movement based on a transmission state, the call center refuses to provide non-critical services (i.e. driving directions) until the vehicle stops moving or is placed in a status where the vehicle is substantially immobile.

In one embodiment, navigation maneuvers are transmitted in real time to the handheld communication device 105 based on vehicle location. In one embodiment, the navigation maneuvers are obtained from the call center, and stored in memory within the MVCU 110 and in communication with the telematics unit 120. In one embodiment, navigational maneuvers are sent from the telematics unit 120 to the handheld communication device 105 in response to wheel movement. In one embodiment, navigational maneuvers are sent from the telematics unit 120 to the handheld communication device 105 in response to wheel speed. In one embodiment, navigational maneuvers are sent from the telematics unit 120 to the handheld communication device 105 in response to dead reckoning calculations performed by the telematics unit 120.

Figure 5:
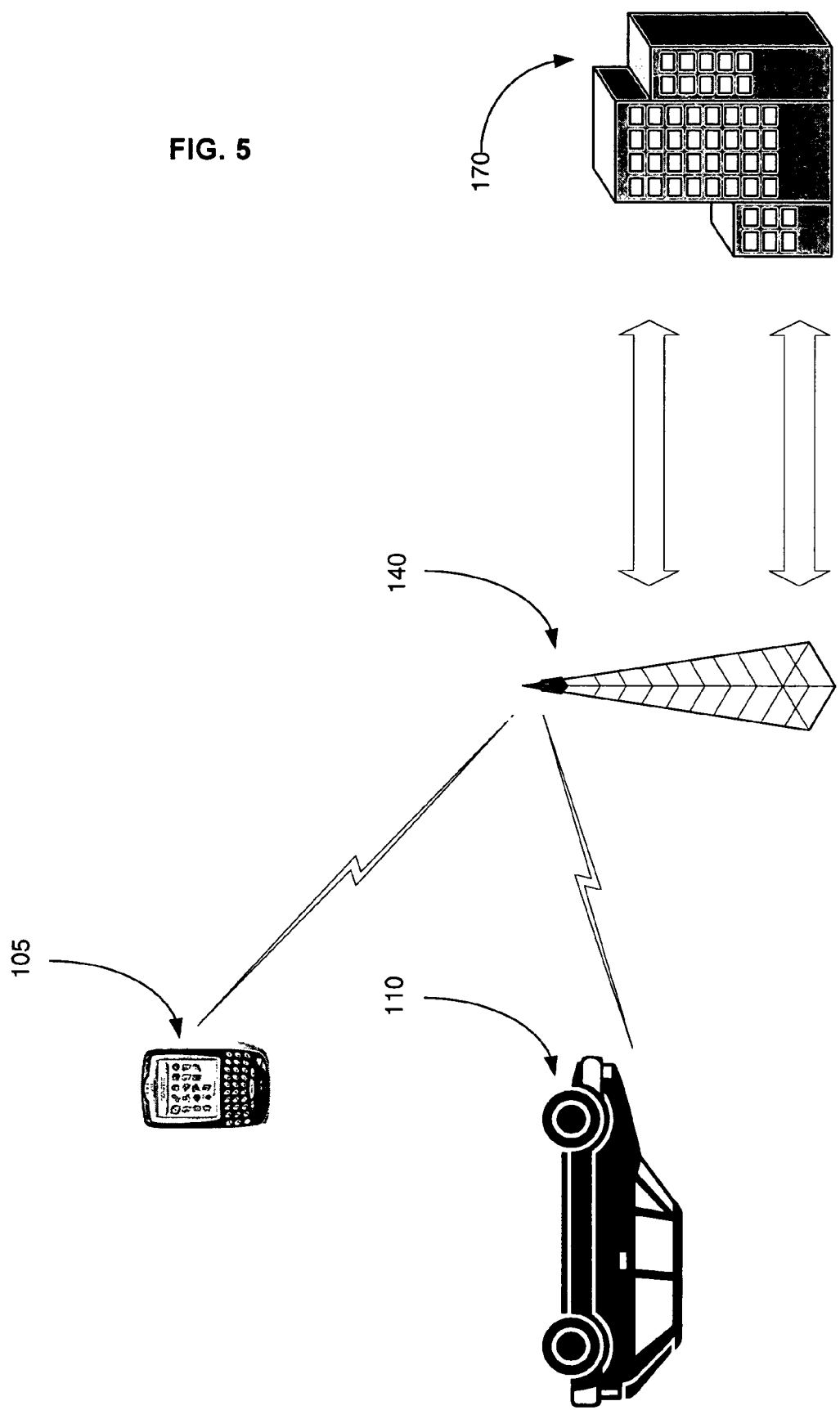
FIG. 5 illustrates a schematic diagram of one embodiment of a method for communicating between a handheld communication unit and a vehicle, in accordance with one aspect of the invention.

FIG. 5 illustrates a schematic diagram of one embodiment of communications between a MVCU 110, handheld communication device 105, cellular network 140 and call center 170, in accordance with one embodiment of the invention. As shown in FIG. 5, both MVCU 110 and handheld communication device 105 communicate with cellular network 140. MVCU 110 is illustrated 'upside down' reflecting a currently disabled or non-moving status. In one embodiment, FIG. 5 represents an operating environment for the trigger-based communications described with reference to FIGS. 3 and 4.

Figure 6:
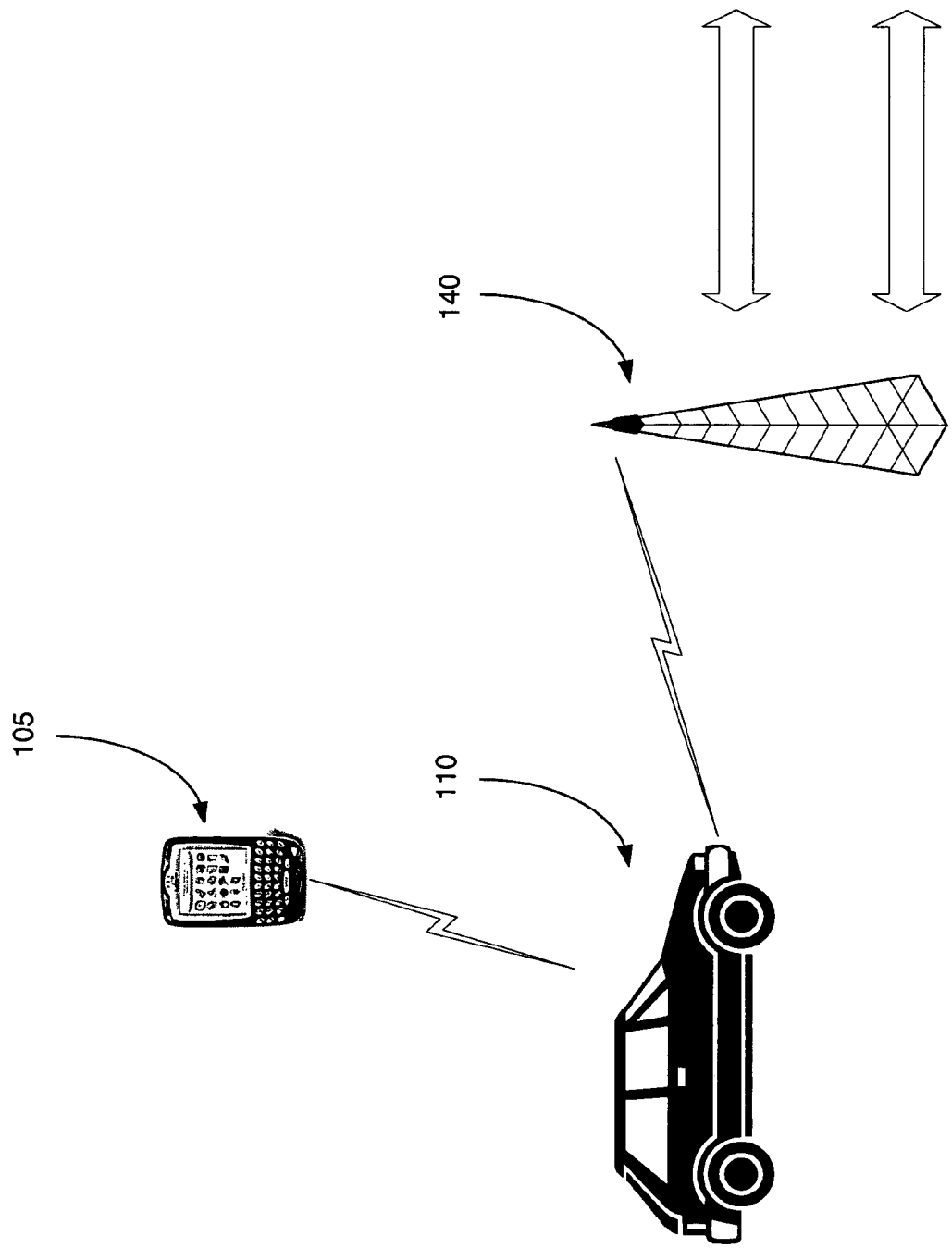
FIG. 6 illustrates a schematic diagram of one embodiment of a method for communicating between a handheld communication unit and a vehicle, in accordance with one aspect of the invention.

FIG. 6 illustrates a schematic diagram of one embodiment of communications between a MVCU 110, handheld communication device 105, cellular network 140 and call center 170, in accordance with one embodiment of the invention. As shown in FIG. 6, handheld communication device 105 communicates with MVCU 110. In one embodiment, FIG. 5 represents an operating environment for the communications described with reference to FIG. 2.

FIG. 7 illustrates one embodiment of a look-up table 700 in accordance with one aspect of the invention. The look-up table, in one embodiment, is stored and maintained at call center 170, for example in communication services databases 176. In one embodiment, the look-up table 700 maintains an association between a handheld communication unit 105 and a MVCU 110 or a telematics unit 120 associated with the vehicle. As shown at 700, MVCU "V0001" is associated with handheld communication unit "HCU0052", "V0004" is associated with "HCU9845", and "V5678" is associated with "HCUAE$R." Those of ordinary skill will readily recognize that look-up table 700 can include more than 3 entries, and that look-up table 700 may include other information in addition to the shown entries.

The present invention may be embodied in other specific forms without departing from the spirit or essential characteristics. The described embodiments are to be considered in all respects only as illustrative and not restrictive. Those of ordinary skill in the art will readily recognize that specific time intervals or time spans other than those that are mentioned herein are contemplated, and would be able to implement such an alternate implementation without undue experimentation.

What is claimed is:

1. A method for providing vehicle services to a user of a motor vehicle, the method comprising: receiving at a call center a text message from the user that is transmitted wirelessly from a handheld communication device by the user; determining a vehicle that is associated with the user of the handheld communication device; contacting from the call center a telematics unit in the vehicle; requesting vehicle information from the telematics unit in the vehicle; and providing at least one vehicle service based on the text message and the requested vehicle information.

2. The method of claim 1 wherein the user is hearing impaired.

3. The method of claim 1 wherein the vehicle is associated with the user via identification included within a header of the text message.

4. The method of claim 1 wherein the vehicle is associated with the user via identification obtained from a look-up table.

5. The method of claim 1 wherein the text message is sent from the user using an instant messaging protocol.

6. The method of claim 1 wherein the telematics unit receives the text message from the handheld communication device using a short-range wireless communication protocol and the call center receives the text message from the telematics unit over a wireless network.

7. A method for transmitting a text message to a hearing impaired user of a motor vehicle comprising: receiving a trigger-based request from a telematics unit at a call center, via a wireless communication from the telematics unit; identifying a handheld communication device that has wireless communication capability separate from the telematics unit and that is associated with the telematics unit based on the request; and transmitting a text message to the identified handheld communication device.

8. The method of claim 7 further comprising: receiving a response based on the transmitted text message; and providing vehicle services in response to the transmitted text message and trigger based request.

9. The method of claim 7 wherein transmitting the text message comprises transmitting a text message to the telematics unit via a wireless network and transmitting the text message from the telematics unit to the handheld communication device via a short range wireless network.

10. The method of claim 7 wherein the trigger-based request comprises an identity of the associated handheld communication device.

11. The method of claim 7 wherein the association between the handheld communication device and telematics unit is determined via a look-up table at the call center.

12. The method of claim 7 wherein the text message is transmitted using an instant messaging protocol.

13. A computer usable medium comprising computer readable code for providing vehicle services to a user of a motor vehicle, the medium comprising: computer readable code for receiving at a call center a text message from the user that is transmitted wirelessly from a handheld communication device by the user; computer readable code for determining a vehicle that is associated with the user of the handheld communication device; computer readable code for contacting from the call center a telematics unit in the vehicle; computer readable code for requesting vehicle information from the telematics unit in the vehicle; and computer readable code for providing at least one vehicle service based on the text message and the requested vehicle information.

14. The medium of claim 13 further comprising computer readable code for associating the vehicle with the user via identification obtained from a look-up table.

15. The medium of claim 13 further comprising computer readable code for sending the text message from the user using an instant messaging protocol.

16. The medium of claim 13 wherein the telematics unit receives the text message from the handheld communication device using a short-range wireless communication protocol and the call center receives the text message from the telematics unit over a wireless network.

17. A computer usable medium comprising computer readable code for transmitting a text message to a hearing impaired user of a motor vehicle; the medium comprising: computer readable code for receiving a trigger-based request from a telematics unit at a call center, via a wireless communication from the telematics unit; computer readable code for identifying a handheld communication device that has wireless communication capability separate from the telematics unit and that is associated with the telematics unit based on the request; and computer readable code for transmitting a text message to the identified handheld communication device.

18. The medium of claim 17 further comprising: computer readable code for receiving a response based on the transmitted text message; and computer readable code for providing vehicle services in response to the transmitted text message and trigger based request.

19. A system for providing vehicle services to a user of a motor vehicle, the system comprising: means for receiving at a call center a text message from the user that is transmitted wirelessly from a handheld communication device by the user; means for determining a vehicle that is associated with the user of the handheld communication device; means for contacting from the call center a telematics unit in the vehicle; means for requesting vehicle information from the telematics unit in the vehicle; and means for providing at least one vehicle service based on the text message and the requested vehicle information.

* * * * *